April 2, 1940.  J. B. BAKER  2,195,795
ROLLER BEARING
Filed July 5, 1938  3 Sheets-Sheet 1
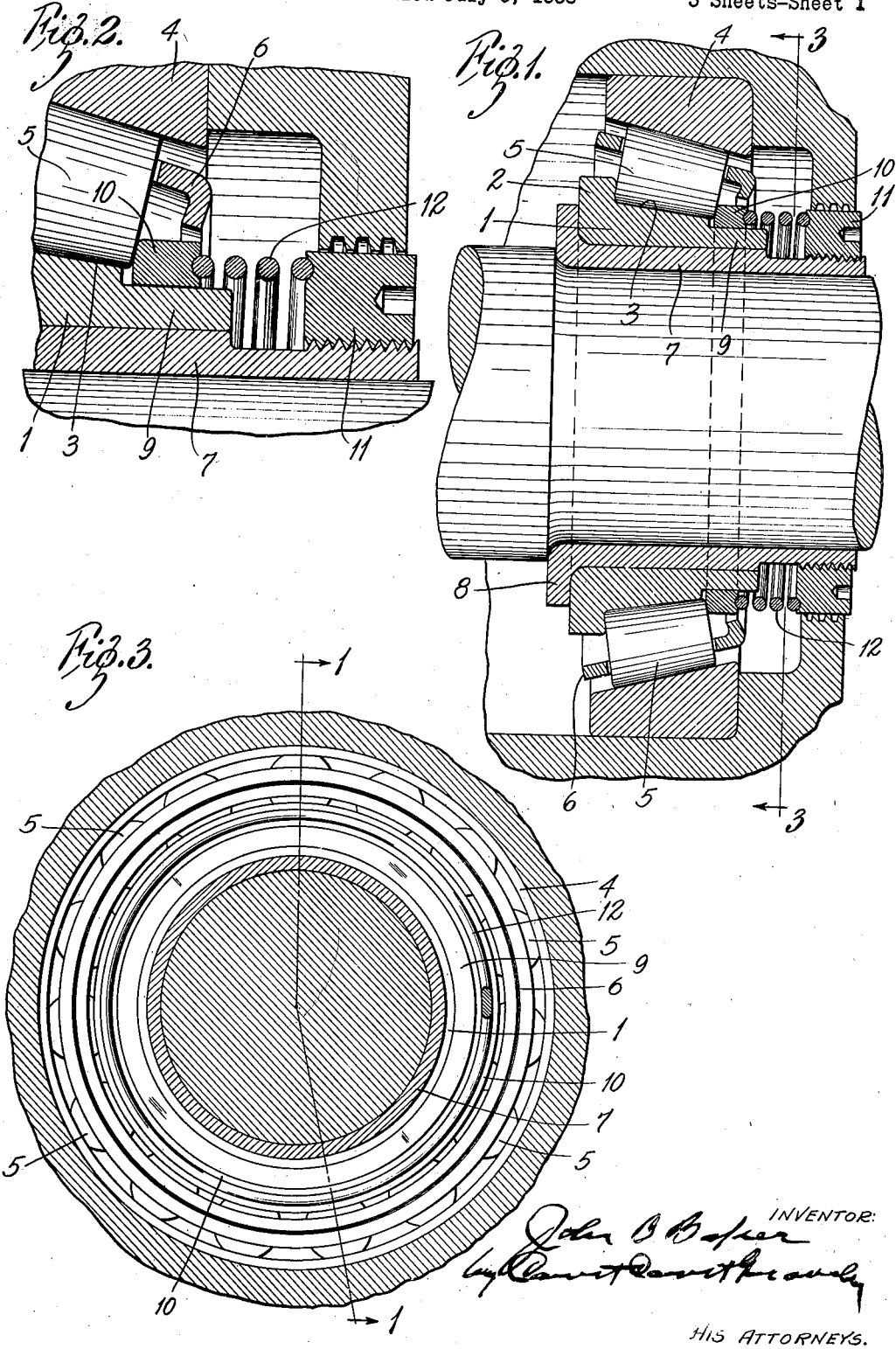
INVENTOR:
John B. Baker
HIS ATTORNEYS.

April 2, 1940.  J. B. BAKER  2,195,795
ROLLER BEARING
Filed July 5, 1938  3 Sheets-Sheet 2
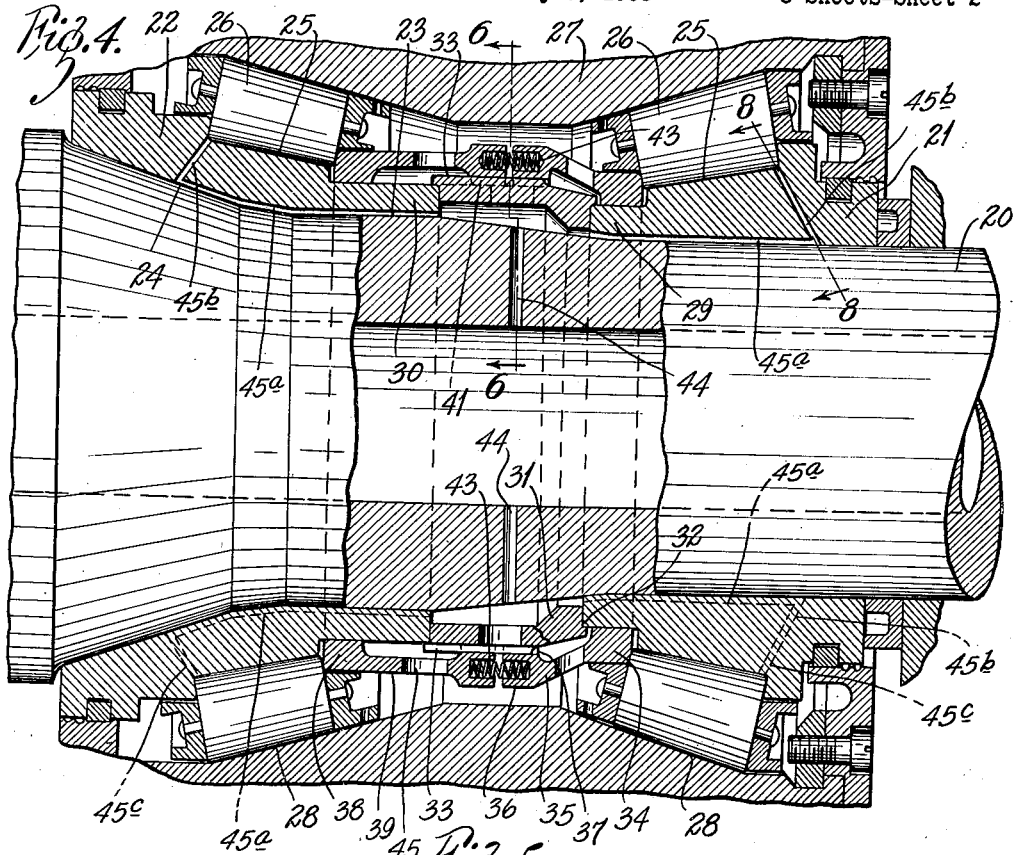
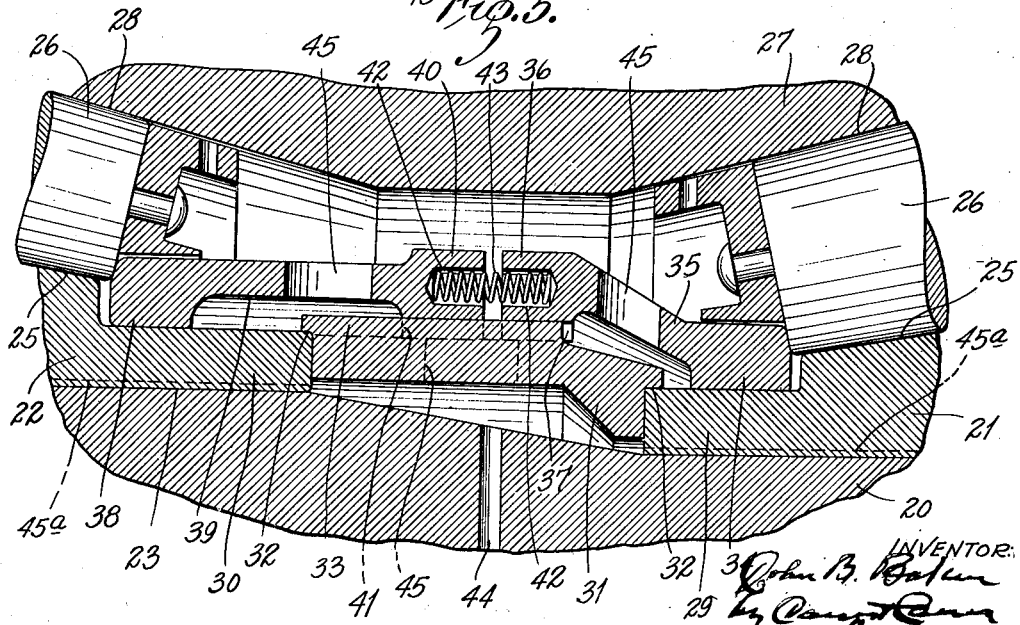

April 2, 1940. J. B. BAKER 2,195,795
ROLLER BEARING
Filed July 5, 1938 3 Sheets-Sheet 3

INVENTOR:
John B. Baker
by his ATTORNEYS

Patented Apr. 2, 1940

2,195,795

UNITED STATES PATENT OFFICE 2,195,795

ROLLER BEARING

John B. Baker, Canton, Ohio, assignor to The Timken Roller Bearing Company, Canton, Ohio, a corporation of Ohio Application July 5, 1938, Serial No. 217,421

6 Claims. (Cl. 308—214)

My invention relates to roller bearings, particularly to taper roller bearings of the type wherein the rollers are closely guided between ribs, the rib at the large end of the rollers withstanding the end thrust on said rollers and the rib at the small end guiding the rollers and preventing them from moving away from the thrust rib. The invention has for its principal objects to reduce the noise of such bearings, to accommodate expansion and necessary endwise movement of the rollers, to facilitate lubrication of the rollers and to permit the adjustment of the pressure of the small end rib against the rollers. Other objects and advantages will appear hereinafter.

The invention consists principally in providing the inner bearing member with a pilot extension on which is supported and guided a floating rib which is held against the rollers by means of a spring. The invention further consists in the roller bearing and in the parts and combinations and arrangements of parts hereinafter described and claimed.

In the accompanying drawings,

Fig. 1 is a longitudinal sectional view on the line 1—1 of Fig. 3 of a roller bearing embodying my invention;

Fig. 2 is a partial longitudinal section on an enlarged scale, showing the floating thrust rib and directly associated parts;

Fig. 3 is a cross-sectional view on the line 3—3 in Fig. 1;

Fig. 4 is a longitudinal sectional view of a double roller bearing embodying my invention, said bearing being a crank pin bearing of the type shown in Buckwalter Patent No. 1,951,126;

Fig. 5 is a longitudinal sectional view on an enlarged scale of the middle portion of the bearing of Fig. 4;

Figure 6:
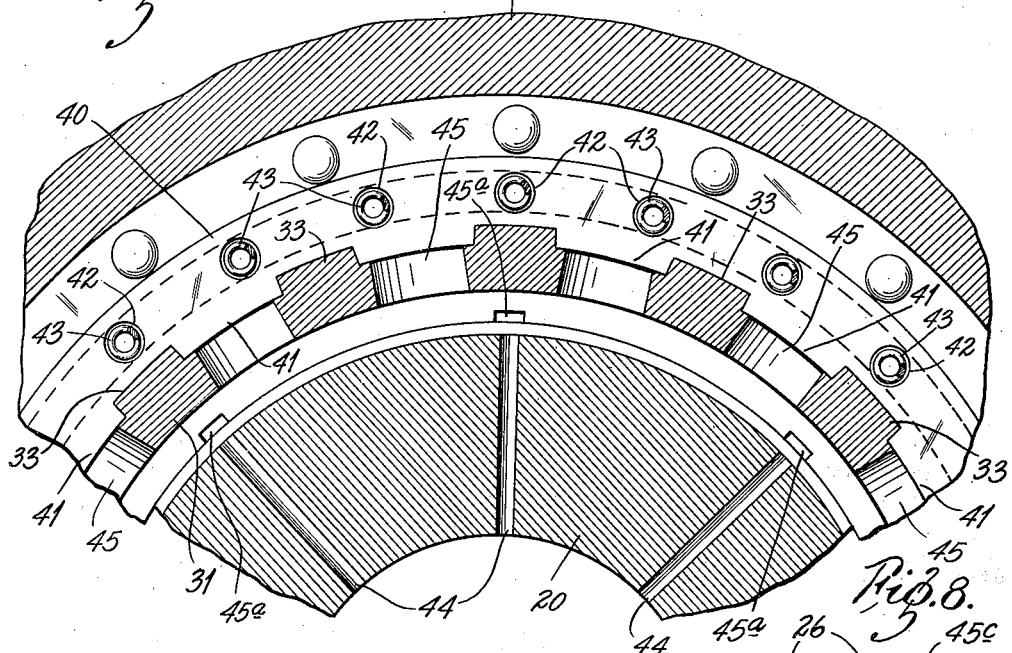
Fig. 6 is a partial sectional view on an enlarged scale on the line 6—6 in Fig. 4.
Figure 8:
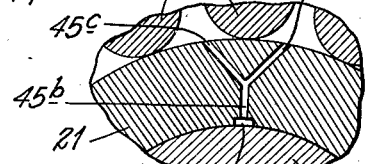
Fig. 8 is a sectional view on the line 8—8 in Fig. 4.

In Fig. 1 is shown a cone 1 or inner bearing member having an integral thrust rib 2 at the large end of its conical raceway 3, a cup 4 or outer bearing member, conical rollers 5 therebetween and a cage 6 for said rollers. The cone is mounted on a suitable seat or sleeve 7 which has a shoulder 8 constituting an abutment for the thrust rib end of the cone 1 and which projects beyond the small end of said cone.

The cone 1 has a cylindrical portion 9 of smaller diameter than the small end of the raceway 3 that projects beyond the end of said raceway. Mounted on said cylindrical extension 9 is an annular ring 10 which constitutes a floating rib for engaging the small ends of said rollers 5. A nut 11 is mounted on the threaded end portion of said seat 7 and a spring 12 is interposed between said nut 11 and said floating rib 10, the pressure exerted by said spring 12 being determined by the position of said nut 11.

In Figs. 4 to 6 is shown a crank pin bearing similar to Buckwalter Patent No. 1,951,126. On the cylindrical outer end of the crank pin 20 is mounted a bearing cone 21 and on the inner end of said pin 20 is mounted a bearing cone 22 whose bore has a cylindrical portion 23 and a tapering portion 24 to conform to the shape of the inner end portion of said crank pin 20. Each cone has a conical raceway 25 tapering toward the middle of the bearing and taper rollers 26 are mounted on said raceways. An integral cup 27 or outer bearing member has conical raceways 28 for the two series of rollers 26. The cone 21 has a cylindrical portion 29 projecting beyond the small end of its raceway and the cone 22 has a similar, somewhat longer, cylindrical projection 30, the ends of said cylindrical projections of said cones being spaced apart. Said cones 21 and 22 are held in proper position by means of a spacer sleeve 31 having rabbeted portions 32 receiving the ends of said cone extensions. Said spacer sleeve 31 has longitudinal external splines 33. A floating rib 34 mounted on the extension of cone 21 has a sleeve portion 35 that flares inwardly of the bearing and a cylindrical end portion 36 which has internal splines 37 fitting the splines 33 on said spacer sleeve 31. A floating rib 38 on the extension of the second cone 22 has a projecting sleeve portion 39 which terminates in a cylindrical portion 40 of substantially the same size as and slightly spaced from the cylindrical portion 36 of said first floating rib 34. Said sleeve portion 40 likewise has internal splines 41 fitting the splines of said spacer.

In the opposed faces of said floating rib extensions 36 and 40 are alined recesses 42 in which are mounted springs 43. Said springs 43 tend to force said ribs 34 and 38 away from each other and into engagement with the ends of the rollers 26. The splined construction of said floating ribs 34 and 38 and said spacer 31 prevents relative rotation of the floating ribs and thus maintains the alinement of the recesses 42 in which said springs 43 are mounted.

The crank pin 20 has radial passageways 44 therethrough permitting passage of lubricant and the spacer member 31 and the floating ribs 34 and 38 have openings 45 therethrough permitting the passage of lubricant. Longitudinal passageways 45a are provided in the cone bores which communicate with lateral passageways 45b having branches 45c which open into the bearing surfaces of the cones at the bases of the thrust ribs. Thus lubricant from the interior of the hollow crank pin may pass freely to the bearings. The roller engaging faces of said floating ribs may be given a curvature that will assist in proper lubrication of the rollers.

Figure 7:
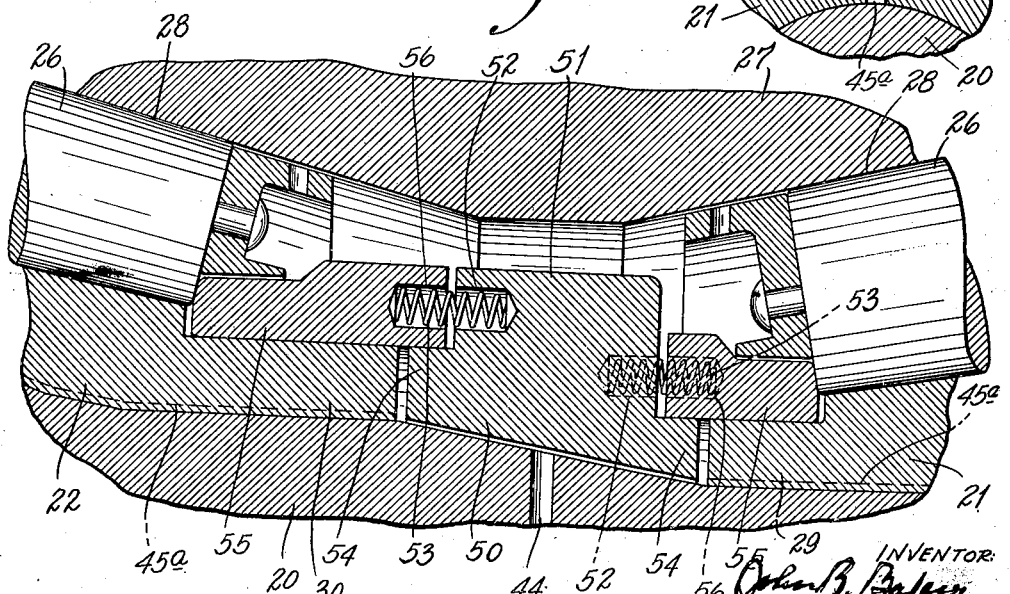
Fig. 7 is a partial longitudinal sectional view of a modification.

In the modified construction shown in Fig. 7, the spacer member 50 has a central rib 51 in which faces are recesses 52 for receiving springs 53 and cylindrical portions 54 on either side of said rib. On each cylindrical portion 54 is slidably mounted the floating rib 55 for one bearing cone. The face of each floating rib 55 adjacent to the rib of the spacer member is provided with recesses 56 for receiving portions of said springs 53. By this arrangement, separate springs 53 are provided for the individual floating ribs 55.

The above described construction provides close guiding of the rollers, which is desirable in some circumstances, and it is particularly intended for unusual service conditions wherein the rollers may be so heated as to lengthen or wherein the rollers may be forced axially in the direction of their small ends. The resilient mounting of the floating ribs permits movement of said ribs to accommodate the expansion or movement of the rollers and, at the same time, the spring pressure tends to restore the rollers to their normal position and urges the rollers into contact with the thrust rib. The construction is thus particularly adaptable to mountings wherein the rollers pass from a heavy load zone into a no-load zone and would thus tend to move away from the thrust rib.

Obviously, numerous changes may be made without departing from my invention and I do not wish to be limited to the precise construction shown.

What I claim is:

1. A roller bearing construction comprising an inner bearing member having an integral rib at one end and a cylindrical extension at the other end, a seat for said bearing member having a threaded portion beyond said extension, rollers on said inner bearing member, a rib sleeved on said cylindrical extension of said inner bearing member and engaging the ends of said rollers, a nut on said threaded portion of said seat and a spring interposed between said nut and said rib.

2. A roller bearing construction comprising spaced bearing members with integral ribs at their remote ends, said bearing members having cylindrical extensions at their adjacent ends, bearing rollers on said bearing members and a spring pressed rib engaging the ends of each series of rollers, said ribs having cylindrical bores sleeved on said cylindrical portions of said bearing members, respectively.

3. A roller bearing construction comprising spaced bearing cones with their small ends opposed, each cone having a cylindrical extension at its small end, a spacer interposed between said cones, rollers on said cones, a floating rib on each of said cone extensions, each rib having a projecting portion fitting over a portion of said spacer and springs engaging said projecting portions of said ribs for yieldably holding said ribs against the respective series of rollers.

4. A roller bearing construction comprising spaced bearing cones with their small ends opposed, each cone having a cylindrical extension at its small end, a spacer interposed between said cones, said spacer having external longitudinal splines, rollers on said cones, a floating rib on each of said cone extensions, each rib having a projecting portion with internal splines fitting the splines of said spacer and springs interposed between said projecting portions of said ribs whereby said ribs are yieldably held against the respective series of rollers.

5. A roller bearing construction comprising spaced bearing cones with their small ends opposed, each cone having a cylindrical extension at its small end, a spacer interposed between said cones, said spacer having external longitudinal splines, rollers on said cones, a floating rib on each of said cone extensions, each rib having a projecting portion with internal splines fitting the splines of said spacer and springs interposed between said projecting portions of said ribs whereby said ribs are yieldably held against the respective series of rollers, said spacer and said extensions of said floating ribs having openings for lubricant therethrough.

6. A roller bearing construction comprising a bearing member having a cylindrical extension at one end, rollers on said bearing member, a floating rib having a circular opening whereby it is supported and closely guided by said extension of said bearing member, a spring engaging said floating rib and pressing it toward the ends of said rollers and an abutment for said spring.

JOHN B. BAKER.